United States Patent
Lagrange et al.

[15] 3,688,316
[45] Sept. 5, 1972

[54] TOTAL KNEE JOINT PROSTHESIS

[72] Inventors: Jean Lagrange, 7, rue Pasteur, Saint-Cloud; Emile Letournel, 15, Avenue de la Porte de Choisy, Paris, both of France

[22] Filed: Nov. 4, 1970

[21] Appl. No.: 86,695

[52] U.S. Cl. ........................ 3/1, 128/92 C, 287/14, 287/97
[51] Int. Cl. ........................ A61f 1/24, A61f 1/00
[58] Field of Search ............ 3/1, 22; 128/92 C, 92 R; 287/97, 14

[56] References Cited

FOREIGN PATENTS OR APPLICATIONS

| | | |
|---|---|---|
| 1,122,634 | 5/1956 | France ..................... 128/92 C |
| 1,047,640 | 7/1953 | France ..................... 128/92 C |
| 163,476 | 6/1958 | Sweden .................... 128/92 C |

OTHER PUBLICATIONS

" Metal Alloplasty of the Knee Joint" by E. J. Moeys, Journal of Bone & Joint Surgery, Vol. 36A, No. 2, April 1954, pp. 363– 367.
Downs Total Knee Replacement (Advertisement), Journal of Bone & Joint Surgery, British Vol. 50– B, No. 2, May 1968, page XXIII
" Factors in the Design of an Artificial Hip Joint" by J. Charnley, Proceedings Institute of Mechanical Engineers, Vol. 181, Part 3J, 1966– 1967 page 111 relied upon.

Primary Examiner—Richard A. Gaudet
Assistant Examiner—Ronald L. Frinks
Attorney—Karl F. Ross

[57] ABSTRACT

A prosthetic knee joint is formed from a polymeric bearing member, with an upstanding shank received in the femoral shaft, and a metallic rocking member inserted into the tibia. The rocking member, having a stem with a disk below the bearing member abutting the tibia, is pivotally supported with the aid of a transverse pin in the bearing member which is partly cut away at the rear to permit a relative swinging of the two members over an arc of about 120°.

11 Claims, 4 Drawing Figures

PATENTED SEP 5 1972 3,688,316

Jean Lagrange
Emile Letournel
Inventors.

By Karl F. Ross
Attorney

TOTAL KNEE JOINT PROSTHESIS

Our present invention relates to a total knee prosthesis designed to replace a knee joint impaired through accident or illness.

So-called mixed prostheses, partly of metal and partly of polymeric material, have already been proposed for a partial or complete replacement of a knee. Regarding partial prostheses of this type, difficulties have heretofore arisen in their fastening. On the other hand, the insertion of a total knee prosthesis involves the sacrifice of much bone structure and also complicates the imbedding of its hinge in protective periarticular tissue. The major drawback of conventional total knee prostheses, however, resides in their insufficient mobility and their susceptibility to detachment.

Our present invention, therefore, has for its object the provision of a mixed total knee prosthesis, designed to afford a good mobility to the wearer as well as a stability comparable to that of a natural joint, coupled with a secure anchoring of the prosthesis to the bones.

This object is realized, pursuant to our invention, by the provision of a bearing member fitting between the femoral condyles, in combination with a metallic rocker member having a depending stem receivable in the tibia, the rocker member further including a transverse pin on the stem which is journaled in the bearing member for positioning in line with the physiological knee axis; a transverse shoulder on the stem, located below the bearing member, is engageable by the upper end of the tibia.

The bearing member may consist of synthetic resin, such as high-density polyethylene, in which case it will be advantageous to line at least the surfaces thereof contacted by the rocker member with a wear-resistant metallic coating, preferably chromium-cobalt alloy. If desired, the entire bearing member could be made from such an alloy or from stainless steel.

According to another advantageous feature of our invention, the bearing member consists of an upper and a lower half adjoining each other along a parting surface which substantially coincides with the horizontal axial plane of the rocker pin. An elongate metallic upward extension of the bearing member, constituting a second stem, is receivable in the femoral shaft.

Pursuant to a further feature of our invention, the bearing member is designed to allow for a rearward swing of the T-shaped rocker member through an arc on the order of 120°, being provided for this purpose with a suitable posterior cutout accommodating the shank of the "T."

These and other features of our invention will be described in detail hereinafter with reference to the accompanying drawing in which.

Figure 1:
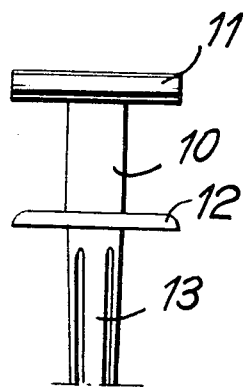
FIG. 1 is a front-elevational view of a metallic rocker member for a total knee prosthesis according to the invention.

In FIG. 1 we have illustrated an integral metallic rocker member designed for attachment to the tibia, this member consisting for example of chromium-cobalt alloy. The rocker member comprises a transverse journal pin 11 supported by a shank 10, both of circular cross-section, constituting together a generally T-shaped metallic unit carried at the top of a vertical stem 13 which is fluted in its lower part for more positive engagement with the shank of the tibia into which it is to be inserted and sealed by means of acrylic cement. Stem 13 also carries, below pin 11, a disk 12 integrally formed therewith, this disk constituting a transverse shoulder designed to come to rest at the top of the tibia. The entire rocker member is cast in a single piece.

Figure 4:
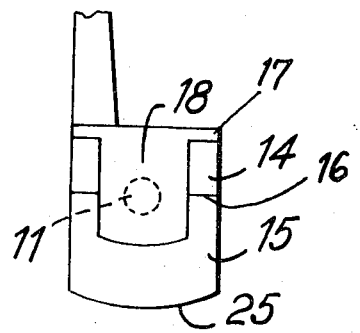
FIG. 4 is a side view of a bearing member, forming part of the prosthesis, as seen in the direction of arrow IV in FIG. 2.
Figure 2:
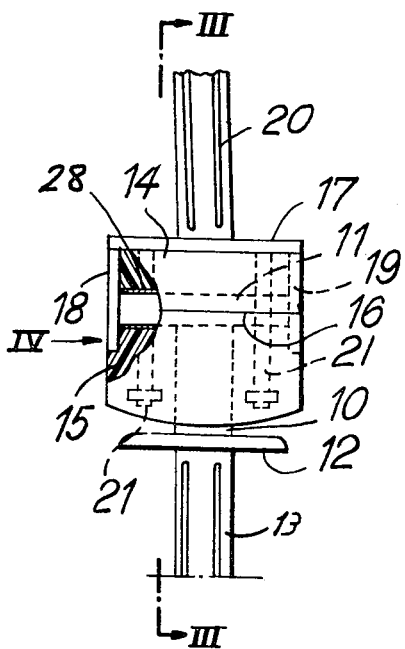
FIG. 2 is a similar view of the complete prosthesis.

In FIG. 2 the pin 11 and the adjoining upper part 10 of the stem 13 of the T-shaped unit are received in a bearing member of synthetic resin such as high-density polyethylene, with the disk 12 carried on the exposed portion of the stem. The bearing member consists of two elements, i.e., an upper half 14 and a lower half 15, adjoining each other along a parting surface 16 in the horizontal diametrical plane of pin 11. The upper bearing half 14 is encased in a metallic yoke including a top plate 17, completely overlying and protecting the upper surface of element 14, and two lateral flanges 18, 19 flush with and imbedded in the end faces of this element; see also FIG. 4. Each flange extends downwardly beyond the parting plane 16 so as to bracket also the lower bearing half 15, thereby assuring the planeness of the sides of the generally prismatic body formed by bearing member 14, 15 and yoke 17 – 19. A second fluted stem 20, rising integrally from plate 17 as a handle of the bifurcate yoke structure, is receivable in the femoral shaft in which it is held by cementing so that the axis of pin 11 will be in line with the mean physiological knee axis; stem 20 is disposed midway between the flanges 18, 19 and, as seen in FIG. 3, is secured to plate 17 at a point forwardly of pin 11.

The lower bearing half 15 serves to hold the assembly together and to insure its lateral stability; it is traversed by four threaded bolts 21, secured to plate 17, which pass completely through the two bearing halves for engagement by countersunk nuts 26 at their lower ends. Thus, the entire bearing block is substantially smooth-surfaced and planiform.

The yoke and handle 17 – 20 and the bolts 21 may consist of the same chromium-cobalt alloy as the rocker member 10.

Figure 3:
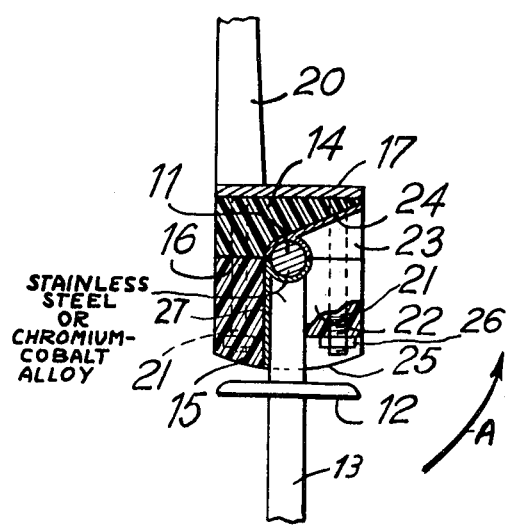
FIG. 3 is a cross-sectional view taken on the line III — III of FIG. 2.

In order to enable a bending of the knee, with a relative swing angle on the order of 120° as shown in FIG. 3, the lower bearing half 15 is provided with a median vertical cutout 22 allowing a rearward swing of the part 10 of the rocker member, this cutout being aligned with a recess 23 in the upper bearing half 14 bounded by a top wall 24 which is tangent to the pin 11 and slopes upwardly and rearwardly at an angle of approximately 30° to the horizontal. Furthermore, in order to facilitate such a rearward swing as indicated by the arrow A in FIG. 3, the underside 25 of bearing half 15 (or at least the rear part thereof flanking the cutout 22) should be convex, as shown, with a curvature in the swing plane approximately centered on the axis of pin 11. When the prosthesis is inserted, the bearing block 14–17 is deeply imbedded in the condylar structure.

The yoke 17–20 with its bolts 21 may also be cast in a single piece from chromium-cobalt alloy as described above for the rocking member 11, 13.

In order to increase the wear resistance of bearing member 14, 15, whose body of polymeric material must support the full weight of the patient, it behooves to coat at least the contact surfaces of this member — engaged or engageable by the parts 10 and 11 of the rocker member — with a protective metallic coating 27 as shown in FIG. 3. A stainless steel, or a chromium-cobalt alloy, may be used for this purpose. Coating 27 is shown to line the walls of the cutout 22, 23 as well as the two pairs of semi-cylindrical grooves constituting the journal bores for pin 11, these bores being bisected by the parting surface 16 passing through the axis thereof.

While chromium-cobalt alloy and high-density polyethylene have been mentioned above as preferred materials for the metallic and resinous parts, respectively, other materials compatible with the mechanical and physiological requirements may also be used.

The several elements of the prostheses may be structurally modified, within the limitations of the appended claims, without departing from the spirit and scope of our invention.

We claim:

1. A total knee prosthesis comprising:
    a metallic rocker member with a horizontal pin, a stem depending from said pin for insertion in the tibial shaft, and a transverse shoulder on said stem below said pin, said shoulder being engageable with the upper end of the tibia;
    an upper bearing part adapted to be imbedded and cemented into the femoral condyles;
    a lower bearing part adjoining said upper bearing part along a parting surface substantially coinciding with a horizontal axial plane of said pin, said bearing parts together defining a pair of journal bores bisected by said parting surface for holding the ends of said pin on opposite sides of said stem, said lower bearing part terminating above said shoulder and being provided with a rearwardly facing median cutout accommodating said stem for a unidirectional swing of said rocker member from a depending vertical position; and
    fastening means interconnecting said bearing parts for holding said pin in position.

2. A prosthesis as defined in claim 1 wherein said stem, said pin and said shoulder constitute a unit cast in one piece.

3. A prosthesis as defined in claim 1 wherein said bearing parts consists essentially of synthetic resin.

4. A prosthesis as defined in claim 3 wherein said upper bearing part is provided with an elongate metallic extension receivable in the femoral shaft.

5. A prosthesis as defined in claim 4 wherein said upper bearing part is provided with a metallic yoke integral with said elongate extension, said yoke terminating in a pair of flanges bracketing the end faces of said upper bearing part and an upper part of said lower member along with said pin, said bearing parts and said yoke together constituting a generally prismatic body with smooth outer surfaces.

6. A prosthesis as defined in claim 5 wherein said flanges are flush with and imbedded in said end faces, said yoke further including an upper plate spanning said flanges and overlying the entire top surface of said upper bearing part.

7. A prosthesis as defined in claim 6 wherein said elongate extension is secured to said upper plate midway between said flanges and forwardly of said pin.

8. A prosthesis as defined in claim 6 wherein said fastening means comprises four bolts extending downwardly from said upper plate through said upper and lower bearing parts, further comprising nuts engaging the ends of said bolts in said lower bearing part.

9. A prosthesis as defined in claim 8 wherein said rocker member, said yoke and said bolts consist essentially of chromium-cobalt alloy, said bearing parts consisting essentially of high-density polyethylene.

10. A prosthesis as defined in claim 1 wherein said upper bearing part has a downwardly open recess in line with said cutout for permitting a rearward swing of said stem through an arc greater than 90°.

11. A prosthesis as defined in claim 10 wherein said recess is bounded by a sloping top wall rising toward the rear at an inclination of substantially 30° to the horizontal and tangent to said pin, said lower bearing part having a convex underside substantially coaxial with said pin.

* * * * *